(12) United States Patent
Steffler et al.

(10) Patent No.: US 6,444,026 B1
(45) Date of Patent: Sep. 3, 2002

(54) PROCESS FOR THE PRODUCTION OF CEMENT CLINKER IN THE ROTARY KILN INTAKE CHAMBER

(75) Inventors: Claus-Jürgen Steffler, Lohmar; Hans-Wilhelm Meyer, Lagenzenn, both of (DE)

(73) Assignee: KHD Humboldt Wedag AG, Cologne (GB)

( * ) Notice: Subject to any disclaimer, the term of this patent is extended or adjusted under 35 U.S.C. 154(b) by 0 days.

(21) Appl. No.: 09/709,231

(22) Filed: Nov. 10, 2000

(51) Int. Cl.⁷ ................................................. C04B 7/43
(52) U.S. Cl. ...................... 106/739; 106/747; 106/752; 106/761; 106/771
(58) Field of Search .................................. 106/739, 747, 106/752, 761, 771

(56) References Cited

U.S. PATENT DOCUMENTS

| | | | |
|---|---|---|---|
| 3,003,757 A | * | 10/1961 | Mitchell |
| 4,251,208 A | * | 2/1981 | Lovichi et al. ................ 432/14 |
| 4,260,369 A | * | 4/1981 | Warshawsky ................... 432/3 |
| 4,286,993 A | * | 9/1981 | Lovichi et al. |
| 5,919,301 A | * | 7/1999 | Rother et al. ................ 106/761 |
| 6,146,133 A | * | 11/2000 | Erhard et al. .................. 432/14 |

* cited by examiner

Primary Examiner—Paul Marcantoni
(74) Attorney, Agent, or Firm—Sonnenschein Nath & Rosenthal

(57) ABSTRACT

In cement clinker production installations, especially with short rotary tubular kiln, in order to find a way in which the thermally highly stressed rotary kiln intake chamber can be protected from overstress and therewith the entire production installation can be reliably operated it is proposed, according to the invention, to introduce directly into the rotary kiln intake chamber, a finely granular non-preheated substance usable in the cement clinker production process, to suspend or disperse it there in the rotary kiln exhaust gas and thereby to continuously cool the kiln intake chamber, and to discharge the heated finely granular substance with the exhaust gas from the kiln intake chamber and to add it to the process raw meal or direct it elsewhere.

19 Claims, 1 Drawing Sheet

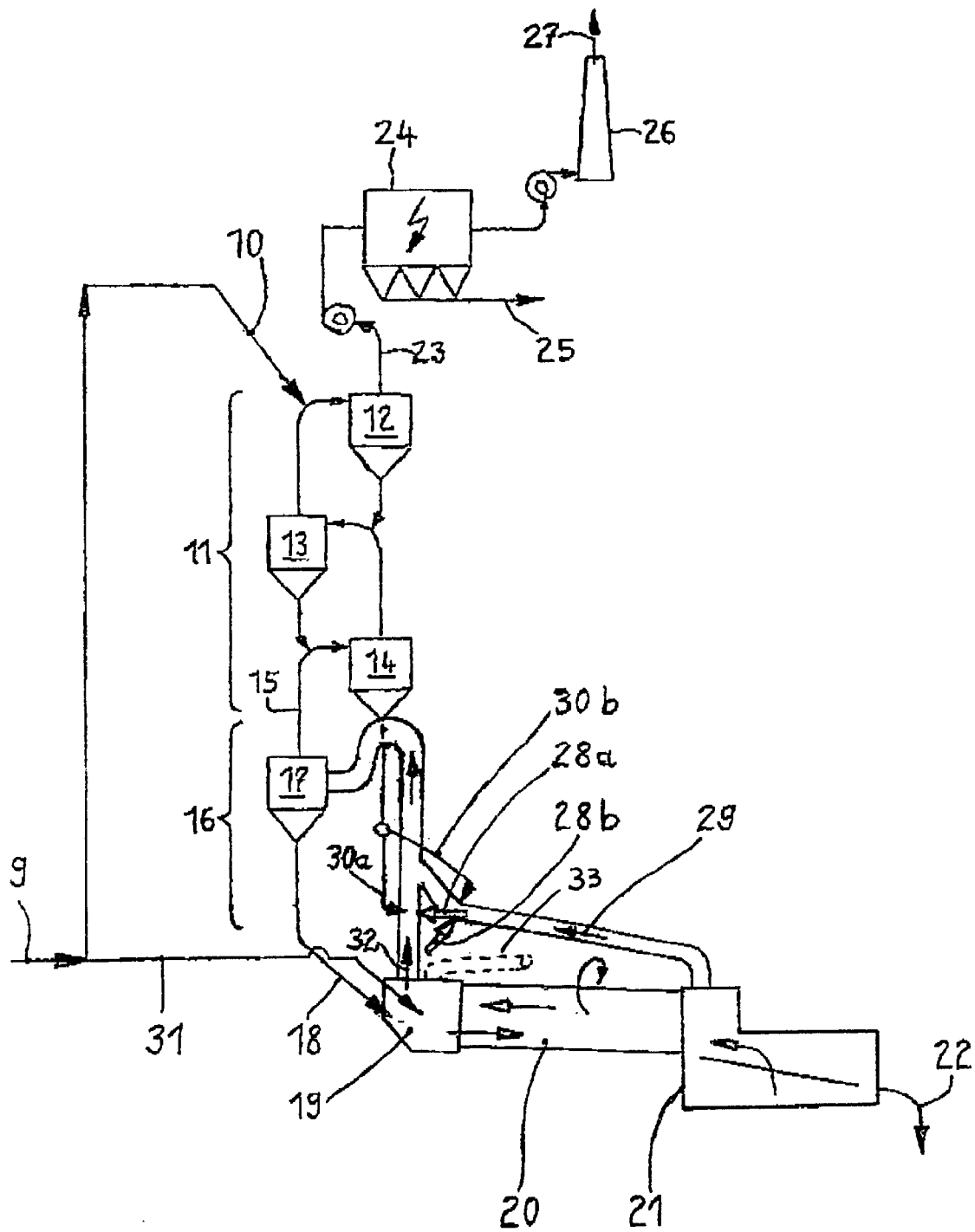

PROCESS FOR THE PRODUCTION OF CEMENT CLINKER IN THE ROTARY KILN INTAKE CHAMBER

BACKGROUND OF THE INVENTION

The invention relates to a process for producing cement clinker from raw meal which is preheated in at least one heat exchanger train traversed by the exhaust gas of a rotary tubular kiln, in particular a cyclone fluidized gas heat exchanger system, that has been precalcined, if necessary, in a precalcination stage and is burned in the sintering zone of the rotary tubular kiln into cement clinker, which is cooled in an after—engaged cooler, in which process in the pre-calcination stage the exhaust gas flow of the rotary tubular kiln and an exhaust air stream of the clinker cooler are used separately or in common for the precalcination of the raw meal.

In installations for the production of cement clinker from cement raw meal, in order to avoid uneconomically long rotary tubular kilns and/or rotary tubular kilns of large diameter, and to keep the specific heat requirement of the cement clinker production process low, it is a known practice to engage upstream of the rotary tubular kiln, as seen on a material flow side, a precalcinator which is equipped with a second firing (besides the firing in the rotary tubular kiln). With a calcination degree of 90 to 95%, the specific heat consumption of the precalcinator alone already amounts to about 550 kcal/kg of cement clinker; i.e., the specific heat requirement of the precalcinator for the execution of the calcination reaction (neutralizing of the cement raw meal) lies far higher than the specific heat requirement for the after-engaged rotary tubular kiln. Thus, in modern cement clinker burning installations with a highly efficient precalcinator about 65% of the total fuel is burned up in the precalcinator alone.

In the development of rotary tubular kilns for cement clinker burning the tendency still is to use only as short as possible rotary tubular kilns, which, incidentally, are still supported on only two bearing stations. Short rotary tubular kilns, to be sure, have in consequence comparatively high kiln exhaust gas temperatures of, for example 1300° C., which lead to a high thermal stress on the kiln intake chamber. The repair of a damaged kiln intake chamber would involve the shutting-off of the entire cement clinker production line. It would not be possible to cool the kiln intake chamber by means of a cooling jacket such as, for example a water mantle, because cement raw meals, that tend to agglutinate, would already cake on cooled kiln intake chamber walls already in the intake chamber of the rotary tubular kiln. This holds for all cement raw meals, but especially for raw meals that contain secondary components such as, for example, alkali compounds, chlorine, sulfur, heavy metals, etc.

SUMMARY OF THE INVENTION

Underlying the invention is the problem, especially in cement clinker production installations with a short rotary tubular kiln, to find a way in which the thermally highly stressed rotary kiln intake chamber can be protected and therewith the entire production installation can be driven operatively and reliably.

In the production of cement clinker according to the invention, a fine granular non-preheated material usable in the cement clinker production process, for example cold non-preheated cement raw meal, is introduced directly into the rotary kiln intake chamber and there it is suspended or dispersed in the rotary kiln exhaust gas, whereby the rotary kiln exhaust gas flowing into the intake chamber at a temperature of for example 1300° C. is cooled abruptly to, for example, 1150° C. and therewith the entire intake chamber is continuously cooled. By its introduction into the kiln intake chamber, the finely granular material is correspondingly heated abruptly and it is discharged with the exhaust gas out of the kiln intake chamber and added to the process raw meal, which then, after passing through a precalcination stage with fuel possibly present, passes into the rotary tubular kiln. The finely granular non-preheated material introduced into the rotary kiln intake chamber and dispersed there in the rotary kiln exhaust gas can simultaneously fulfill at least the three following functions. It acts as a:

a) Cooling medium for the rotary kiln intake chamber,
b) Catalyst for an $NO_x$-reduction reaction for the purpose of reducing the $NO_x$ contained in the hot rotary kiln exhaust gas, which $NO_x$ comes essentially from the high-temperature combustion in the rotary tubular kiln,
c) Condensation nuclei on which gaseous or vaporous harmful substances such as in particular, for example, alkali chlorides and alkali sulfates can condense (freeze out or sublimate).

Especially if the cement raw meal contains secondary components such as, for example, alkali compounds, chlorine, sulfur, heavy metals etc. which evaporate in the range of the sintering zone of the rotary tubular kiln, for example as alkali chlorides and alkali sulfates compounds and condense on the non-preheated fine granular material introduced there, the dispersed fine granular material can be discharged at least partly from the kiln intake chamber via a separate partial gas outlet of its own.

BRIEF DESCRIPTION OF THE DRAWINGS

The invention and its further features and advantages are explained in detail with the aid of the example of an embodiment of a cement clinker processing installation schematically represented in the drawing.

DETAILED DESCRIPTION OF THE PREFERRED EMBODIMENTS

The drawing shows an installation for producing cement clinker from cement raw meal which is fed at 10 into the preheating stage 11, where it passes successively through the cyclone suspended-gas heat exchangers 12 to 14 in combined co-current/countercurrent flow to the hot exhaust gas 15 of a calcining stage 16, in order to be separated in the lowest cyclone 17 from the hot exhaust gas stream 15 and as high-grade (for example 95%) calcined cement raw meal 18 to be introduced into the intake chamber 19 of the rotary tubular kiln 20, in the sintering zone of which it is burned into cement clinker, which is thereupon cooled in a clinker cooler 21, in the example of execution, a grid cooler. The cooled cement clinker leaves the clinker cooler 21 at 22.

The exhaust gas cooled on the cement raw meal leaves the preheating stage 11 of the installation at 23. This exhaust gas 23 is freed from dust 25 in a dust separator, for example the electrostatic dust separator 24, and thereupon it is drawn off as exhaust gas 27 over a main chimney 26.

In the calcination stage 16 provided with fuel 28a, 28b and tertiary air 29 from the clinker cooler, the preheated cement raw meal 30a, 30b emerging from the second-lowest cyclone stage 14 is intensively calcined. There the fuel 28a in the kiln exhaust riser line coming from the kiln intake chamber 19 is advantageously substoichiometrically burned for the purpose of generating a CO-containing reduction zone for the reduction of the harmful material $NO_x$ contained in the rotary kiln exhaust gas, while the fuel 28b in the tertiary air 29 coming from the clinker cooler is advantageously burned superstoichiometrically.

A partial stream of the cold non-preheated cement meal 9 sent into the preheating stage 11 at 10 is led over a mechanical or pneumatic conveyor line 31 directly into the rotary kiln intake chamber 19, and, namely, in the elevation range between the inflow chute for the precalcined raw meal 18 and the upper side of this kiln intake chamber 19. By the cold fine granular meal introduced into the kiln intake chamber over line 31, and suspended or dispersed there in the rotary kiln exhaust gas, the rotary kiln exhaust gas, which in the case of a relatively short rotary tubular kiln 20 can directly have an emergence temperature of for example 1300° C., is suddenly cooled to a temperature of, for example, 1150° C., whereby the kiln intake chamber 19 is continuously cooled and is protected against thermal overstress. The fine granular meal introduced over line 31 and heated in the kiln intake chamber 19 is then discharged out of the kiln intake chamber 19 with the exhaust gas 32, and after passage through the calcining stage 16, it is finally added to the process meal 18 for the purpose of being led onward into the rotary tubular kiln 20.

Instead of a partial stream of cold cement raw meal 9, or in addition to this, there could also be introduced over line 31 a raw meal component as a fine granular substance usable in the cement clinker production process, and possibly also kiln filter dust 25 could be introduced as well from the dust separator 24 into the rotary kiln intake chamber 19.

With a substoichiometric combustion of the fuel 28a introduced into the kiln exhaust gas riser line, a CO-containing reduction zone can be created for the reduction of the $NO_x$ contained in the rotary kiln exhaust gas. The non-preheated raw meal introduced directly into the kiln intake chamber 19 over line 31 can then serve also as catalyst for the $NO_x$ reduction reaction. Insofar as the rotary kiln exhaust gas contains gaseous or vaporous harmful substances, such as for example alkali chlorides and/or alkali sulfates, the meal particles introduced over the line 31 directly into the kiln intake chamber 19 can also further serve as condensation nuclei on which such gaseous or vaporous harmful substances condense. There is then present the possibility of discharging from the kiln intake chamber 19 such meal particles laden with harmful substances, at least partly over a separate partial gas lead-off line of its own optionally shown by dashed line 33. The bypass dust drawn off over such a partial lead-off can according to its composition be entirely removed from the system or else also be used in the clinker grinding.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A process for the production of cement clinker from raw meal which is preheated in at least one heat exchanger train traversed by exhaust gas from a rotary tubular kiln having a cyclone suspended gas-heat exchanger system, said raw meal being precalcined if necessary in a precalcination stage and burned in a sintering zone of the rotary tubular kiln into cement clinker, which cement clinker is cooled in an after-engaged clinker cooler, in which process there are used in the precalcination stage the exhaust gas stream from the rotary tubular kiln and an exhaust air stream from the clinker cooler, separately or together, for the precalcination of the raw meal, comprising the steps of introducing a fine granular non-preheated substance usable in the cement clinker production process directly into an intake chamber of the rotary kiln, suspending or dispersing the fine granular substance there in the rotary kiln exhaust gas and thereby continuously cooling the kiln intake chamber, after which the heated fine granular substance with the exhaust gas is discharged from the kiln intake chamber.

2. A process according to claim 1, wherein said heated fine granular substance, after being discharged from the kiln intake chamber, is added to the process raw meal.

3. A process according to claim 1, wherein a non-preheated cement raw meal is used as the fine granular substance to be introduced into the rotary kiln intake chamber.

4. A process according to claim 1, wherein a raw meal component is used as the fine granular substance to be introduced into the rotary kiln intake chamber.

5. A process according to claim 1, wherein kiln filter dust is used as the fine granular substance to be introduced into the rotary kiln intake chamber.

6. A process according to claim 1, wherein the fine granular substance, introduced into the rotary kiln intake chamber and dispersed there, is discharged from the intake chamber over a separate partial gas lead-off line.

7. A process according to claim 1, wherein the fine granular substance to be introduced into the rotary kiln intake chamber is introduced into the intake chamber in the elevation range between a raw meal inflow chute and an upper side of the kiln intake chamber.

8. A process for the production of cement clinker from raw meal comprising the steps of:

preheating raw meal in at least one heat exchanger train comprising a cyclone suspended gas-heat exchanger system;

directing exhaust gas from a rotary tubular kiln through said heat exchanger train;

precalcining said raw meal in a precalcination stage;

thereafter directing precalcined meal into a sintering zone of the rotary tubular kiln;

thereafter burning said raw meal into cement clinker in the sintering zone of the rotary tubular kiln;

thereafter cooling said burnt cement clinker in a clinker cooler;

directing an exhaust air stream from the clinker cooler into the precalcination stage;

directing an exhaust gas stream from the rotary tubular kiln into said precalcination stage;

introducing a fine granular non-preheated substance directly into an intake chamber of the rotary tubular kiln;

thereafter disbursing the fine granular substance into the rotary kiln exhaust gas to continuously cool the kiln intake chamber;

thereafter discharging the now heated fine granular substance with the exhaust gas from the kiln intake chamber.

9. A process according to claim 8, wherein said heated fine granular substance, after being discharged from the kiln intake chamber, is added to the raw meal in the precalcination stage.

10. A process according to claim 8, wherein a non-preheated cement raw meal is used as the fine granular substance to be introduced into the rotary kiln intake chamber.

11. A process according to claim 8, wherein a raw meal component is used as the fine granular substance to be introduced into the rotary kiln intake chamber.

12. A process according to claim 8, wherein kiln filter dust is used as the fine granular substance to be introduced into the rotary kiln intake chamber.

13. A process according to claim 8, wherein the fine granular substance, introduced into the rotary kiln intake chamber and dispersed there, is discharged from the intake chamber over a separate partial gas lead-off line.

14. A process according to claim 8, wherein the fine granular substance to be introduced into the rotary kiln intake chamber is introduced into the intake chamber in the elevation range between a raw meal inflow chute and an upper side of the kiln intake chamber.

15. A process for the production of cement clinker from raw meal comprising the steps of:

preheating raw meal;

thereafter directing said preheated raw meal through an intake chamber of a rotary tubular kiln and into a sintering zone of the rotary tubular kiln;

thereafter burning said raw meal into cement clinker in the sintering zone of the rotary tubular kiln;

introducing a fine granular non-preheated substance directly into the intake chamber of the rotary tubular kiln;

thereafter disbursing the fine granular substance into the rotary kiln exhaust gas to cool the kiln intake chamber; and thereafter discharging the now heated fine granular substance with exhaust gas from the kiln intake chamber.

16. A process according to claim 15, wherein said heated fine granular substance, after being discharged from the kiln intake chamber, is added to the preheated raw meal.

17. A process according to claim 15, wherein at least one of a non-preheated cement raw meal, a raw meal component and kiln filter dust is used as the fine granular substance to be introduced into the rotary kiln intake chamber.

18. A process according to claim 15, wherein the fine granular substance, introduced into the rotary kiln intake chamber and dispersed there, is discharged from the intake chamber over a separate partial gas lead-off line.

19. A process according to claim 15, wherein the fine granular substance to be introduced into the rotary kiln intake chamber is introduced into the intake chamber in the elevation range between a raw meal inflow chute and an upper side of the kiln intake chamber.

* * * * *